US012746966B2

(12) United States Patent
Yu et al.

(10) Patent No.: US 12,746,966 B2
(45) Date of Patent: Sep. 29, 2026

(54) STEERING DEVICE AND CORNER MODULE INCLUDING THE SAME

(71) Applicant: HL MANDO CORPORATION, Pyeongtaek (KR)

(72) Inventors: Min Hye Yu, Pyeongtaek (KR); Seong Ho Choi, Pyeongtaek (KR); Joon-Kyu Song, Pyeongtaek (KR); Jeongjae Park, Pyeongtaek (KR); Junha Sohn, Pyeongtaek (KR); Dongseon Kim, Pyeongtaek (KR); Oseok Kwon, Pyeongtaek (KR); Mingeun Park, Pyeongtaek (KR); Byungyong Kang, Pyeongtaek (KR); Ye Chan Roh, Pyeongtaek (KR); Sung Jun Jo, Pyeongtaek (KR)

(73) Assignee: HL MANDO CORPORATION, Pyeongtaek (KR)

( * ) Notice: Subject to any disclaimer, the term of this patent is extended or adjusted under 35 U.S.C. 154(b) by 205 days.

(21) Appl. No.: 18/827,948

(22) Filed: Sep. 9, 2024

(65) Prior Publication Data

US 2025/0222976 A1 Jul. 10, 2025

(30) Foreign Application Priority Data

Jan. 9, 2024 (KR) ........................ 10-2024-0003265

(51) Int. Cl.
*B62D 5/04* (2006.01)
*F16H 7/02* (2006.01)

(52) U.S. Cl.
CPC ......... *B62D 5/0418* (2013.01); *B62D 5/0403* (2013.01); *B62D 5/0424* (2013.01); *F16H 7/023* (2013.01)

(58) Field of Classification Search
CPC .......... B60K 7/0007; B60K 2007/0084; B60K 17/043; F16H 7/02; F16H 7/023; B62D 5/0421; B62D 5/0424; B62D 7/023
See application file for complete search history.

(56) References Cited

U.S. PATENT DOCUMENTS

| | | | | |
|---|---|---|---|---|
| 2007/0209862 | A1* | 9/2007 | Budaker | B62D 5/0427 180/444 |
| 2019/0242448 | A1* | 8/2019 | Ross | B60T 13/746 |
| 2019/0245411 | A1* | 8/2019 | Strieter | F16H 7/02 |
| 2024/0300316 | A1* | 9/2024 | Jeon | B60K 7/0007 |
| 2025/0214645 | A1* | 7/2025 | Bae | B62D 5/0418 |

* cited by examiner

*Primary Examiner* — Timothy Hannon
(74) *Attorney, Agent, or Firm* — Harvest IP Law, LLP

(57) ABSTRACT

A steering device and a corner module including the same are disclosed. A steering device according to an aspect of the present disclosure is to steer an in-wheel drive device, and the steering device may include: a housing; a drive motor supported on the housing and having a motor shaft extending up and down; a driving pulley coupled to the motor shaft; a speed reducer including an input shaft parallel to the motor shaft and an output shaft arranged coaxially with the input shaft and coupled to the in-wheel drive device; a driven pulley coupled to the input shaft; a first stage pulley and a second stage pulley that are adjacently coupled up and down to a pulley shaft parallel to the motor shaft and the input shaft and rotate integrally; a first belt connecting the driving pulley and the first stage pulley to transmit power; and a second belt connecting the second stage pulley and the driven pulley to transmit power.

20 Claims, 10 Drawing Sheets

10

STEERING DEVICE AND CORNER MODULE INCLUDING THE SAME

CROSS-REFERENCE TO RELATED APPLICATION

This application claims priority to and the benefit of Korean Patent Application No. 10-2024-0003265, filed on Jan. 9, 2024, the disclosure of which is incorporated herein by reference in its entirety.

BACKGROUND

1. Technical Field

The present disclosure relates to a steering device and a corner module including the same.

2. Discussion of Related Art

An in-wheel drive device is being developed that directly embeds a motor inside the wheel so that the power of the motor is directly transmitted to the wheel. These in-wheel drive devices can omit intermediate-stage power transmission devices such as speed reducers and differential gears, reducing the weight of mobile apparatuses such as vehicles or mobile robots, and reducing energy loss during the power transmission process.

In the early stages of development, these in-wheel drive devices were steered using traditional steering devices applied to existing mobile apparatuses. However, recently, a so-called corner module that combines a steering device suitable for an in-wheel drive device has been developed.

The steering device used in the conventional corner module used a single pulley structure to transmit the rotational driving force of the steering motor to the input shaft of the steering reducer. For example, the driving pulley coupled to the motor shaft of the steering motor and the driven pulley coupled to the input shaft of the steering reducer were connected with a single belt to transmit the rotational driving force of the steering motor to the input shaft of the steering reducer.

However, due to the nature of the single pulley structure, the upper end of the driving pulley coupled to the motor shaft and the upper end of the driven pulley coupled to the input shaft are placed on the same horizontal plane, and based on this, when a housing surrounding the driving pulley and the driven pulley was made, there was a problem in that the gap between the housing and the driven pulley narrowed, making it difficult to secure space to install necessary devices or parts in a space above the driven pulley within the housing.

To solve this problem, conventionally, the size of the housing was forcibly increased to secure the space above the driven pulley. However, in this case, there was a problem that the overall height of the steering device including the housing increased.

SUMMARY

The present disclosure is to solve the above problems, and the present disclosure is directed to providing a steering device configured to secure a space above a driven pulley coupled to an input shaft of a speed reducer.

The problems of the present disclosure are not limited to those mentioned above, and other problems not mentioned will be clearly understood by those of ordinary skill in the art from the following description.

The objects of the present disclosure are not limited to the above-described objects, and other objects that are not mentioned will be able to be clearly understood by those skilled in the art to which the present disclosure pertains from the following description.

According to an aspect of the present disclosure, a steering device for steering an in-wheel drive device may be provided, and the steering device may include: a housing; a drive motor supported on the housing and having a motor shaft extending up and down; a driving pulley coupled to the motor shaft; a speed reducer including an input shaft parallel to the motor shaft and an output shaft arranged coaxially with the input shaft and coupled to the in-wheel drive device; a driven pulley coupled to the input shaft; a first stage pulley and a second stage pulley that are adjacently coupled up and down to a pulley shaft parallel to the motor shaft and the input shaft and rotate integrally; a first belt connecting the driving pulley and the first stage pulley to transmit power; and a second belt connecting the second stage pulley and the driven pulley to transmit power.

In this case, the pulley shaft may be disposed between the motor shaft and the input shaft.

Meanwhile, the first stage pulley and the second stage pulley may be manufactured integrally.

Meanwhile, the first stage pulley and the second stage pulley may be rotatably supported on the pulley shaft.

Meanwhile, the driving pulley, the driven pulley, the first stage pulley, the second stage pulley, the first belt, and the second belt may be disposed in the internal space of the housing, and the gap between the second belt and an upper wall of the housing may be greater than the gap between the first belt and the upper wall of the housing.

In this case, an upper end of the input shaft may be spaced apart from the upper wall of the housing and be located in the internal space of the housing.

In this case, the upper end of the input shaft may do not protrude upward from the upper surface of the driven pulley.

Meanwhile, the input shaft may have a hollow shape, the output shaft may be disposed in the hollow of the input shaft, and an encoder may be installed on the upper end of the output shaft that protrudes upward from the upper opening of the input shaft.

In this case, the output shaft may have a hollow shape, and the upper end of the output shaft may protrude through the upper wall of the housing, and a cable support member may be coupled to the upper end of the output shaft protruding through the upper wall of the housing.

Meanwhile, the axial distance between the pulley shaft and the motor shaft and the axial distance between the pulley shaft and the input shaft may be the same.

Meanwhile, a first through hole and a second through hole may be formed in the housing through which the upper end and the lower end of the pulley shaft respectively pass, the first through hole and the second through hole may have a long hole shape, and when the pulley shaft changes its position along the first through hole and the second through hole, the tension applied to the first belt and the second belt may change.

In this case, the first through hole and the second through hole may pass through a center of a line segment that vertically meets an axis of the motor shaft and an axis of the input shaft, and have a long hole shape extending along a straight line orthogonal to the axis of the pulley shaft and the line segment, and even when the pulley shaft is changed in position along the first through hole and the second through hole, the axial distance between the pulley shaft and the input shaft and the axial distance between the pulley shaft and the motor shaft may remain the same.

In this case, the pulley shaft may constitute part of a cam bolt assembly, and the cam bolt assembly may include: the pulley shaft; an integrated cam plate formed eccentrically at one of the upper end and the lower end of the pulley shaft that is exposed to the outside by penetrating the housing, and is supported on the housing; a detachable cam plate eccentrically coupled to the other one of the upper end and the lower end of the pulley shaft that is exposed to the outside by penetrating the housing, and is supported on the housing; and a nut coupled to an end of the pulley shaft coupled to the detachable cam plate to closely contact the detachable cam plate with the housing.

In this case, a first cam guide portion on which one of the integrated cam plate and the detachable cam plate is rotatably seated may be formed around the first through hole of the housing, and a second cam guide portion on which the other one of the integrated cam plate and the detachable cam plate is rotatably seated may be formed around the second through hole of the housing.

Meanwhile, the speed reducer may be a harmonic drive-type speed reducer.

In this case, the speed reducer may include: the input shaft having a hollow shape and exposed downward through the housing; a circular spline having a ring shape, supported by the lower side of the housing in a form surrounding the input shaft exposed downward through the housing, and having internal teeth formed on the inner circumferential surface; a flex spline having a hollow shape, having external teeth formed on the outer circumferential surface to engage with the internal teeth, and being placed inside the circular spline; a wave generator coupled to the input shaft and placed in the hollow of the flex spline to induce a part of the external teeth to engage with the internal teeth; the output shaft disposed in the hollow of the input shaft and having a lower end coupled to a lower end of the flex spline; and an output shaft bearing that supports the output shaft and the flex spline to be relatively rotatable relative to the circular spline.

In this case, the speed reducer may further include a cover member having a ring shape through which the input shaft penetrates, coupled to the upper side of the circular spline, and supported by the lower side of the housing, and an input shaft bearing for inducing the relative rotation of the input shaft and the cover member may be disposed in a through hole of the cover member through which the input shaft penetrates.

In this case, a flex spline extension part extending in a direction perpendicular to the axis of the input shaft may be formed at a lower end of the flex spline, an output shaft extension part extending in a direction perpendicular to the axis of the output shaft and coupled to the flex spline extension part may be formed at a lower end of the output shaft, and an outer wheel of the output shaft bearing may be coupled to the flex spline extension part and the output shaft extension part, and an inner wheel of the output shaft bearing may be coupled to the lower side of the circular spline.

According to another aspect of the present disclosure, a steering device may be provided, including: a housing; a drive motor supported on the housing and having a motor shaft extending up and down; a driving pulley coupled to the motor shaft; a speed reducer including an input shaft parallel to the motor shaft; a driven pulley coupled to the input shaft; a first stage pulley and a second stage pulley that rotate integrally about an axis parallel to an axis of the motor shaft and an axis of the input shaft; a first belt connecting the driving pulley and the first stage pulley to transmit power; and a second belt connecting the second stage pulley and the driven pulley to transmit power.

According to yet another aspect of the present disclosure, a corner module may be provided, including the steering device; and the in-wheel drive device coupled to the output shaft of the steering device.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
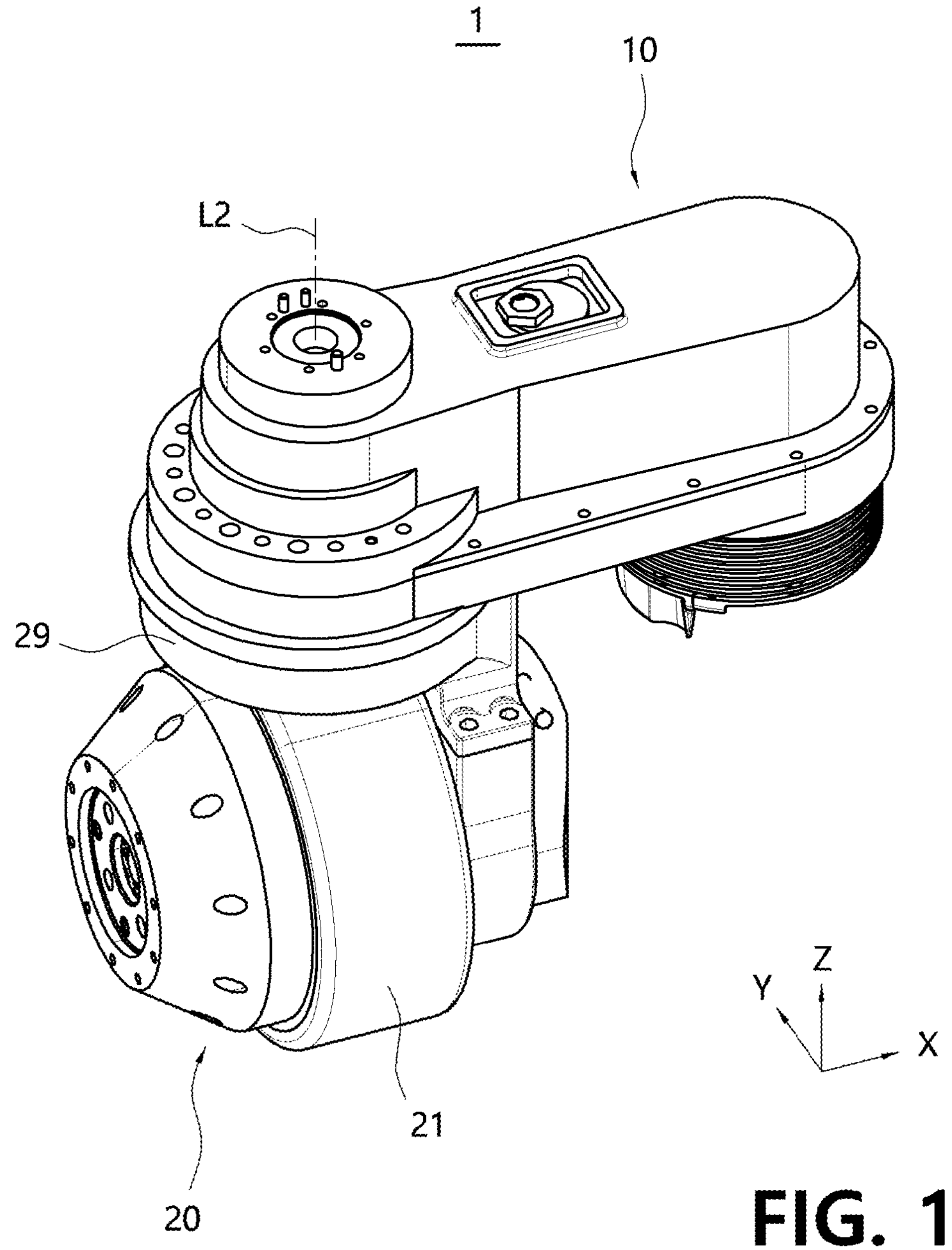
FIG. 1 is a perspective view of a corner module viewed from one direction according to an exemplary embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as “comprise” or “have” are intended to specify the presence of features, numbers, steps, operations, components, parts, or combinations thereof described in the specification and do not preclude the possibility of the presence or addition of one or more other features, numbers, steps, operations, components, parts, or combinations thereof.

Figure 2:
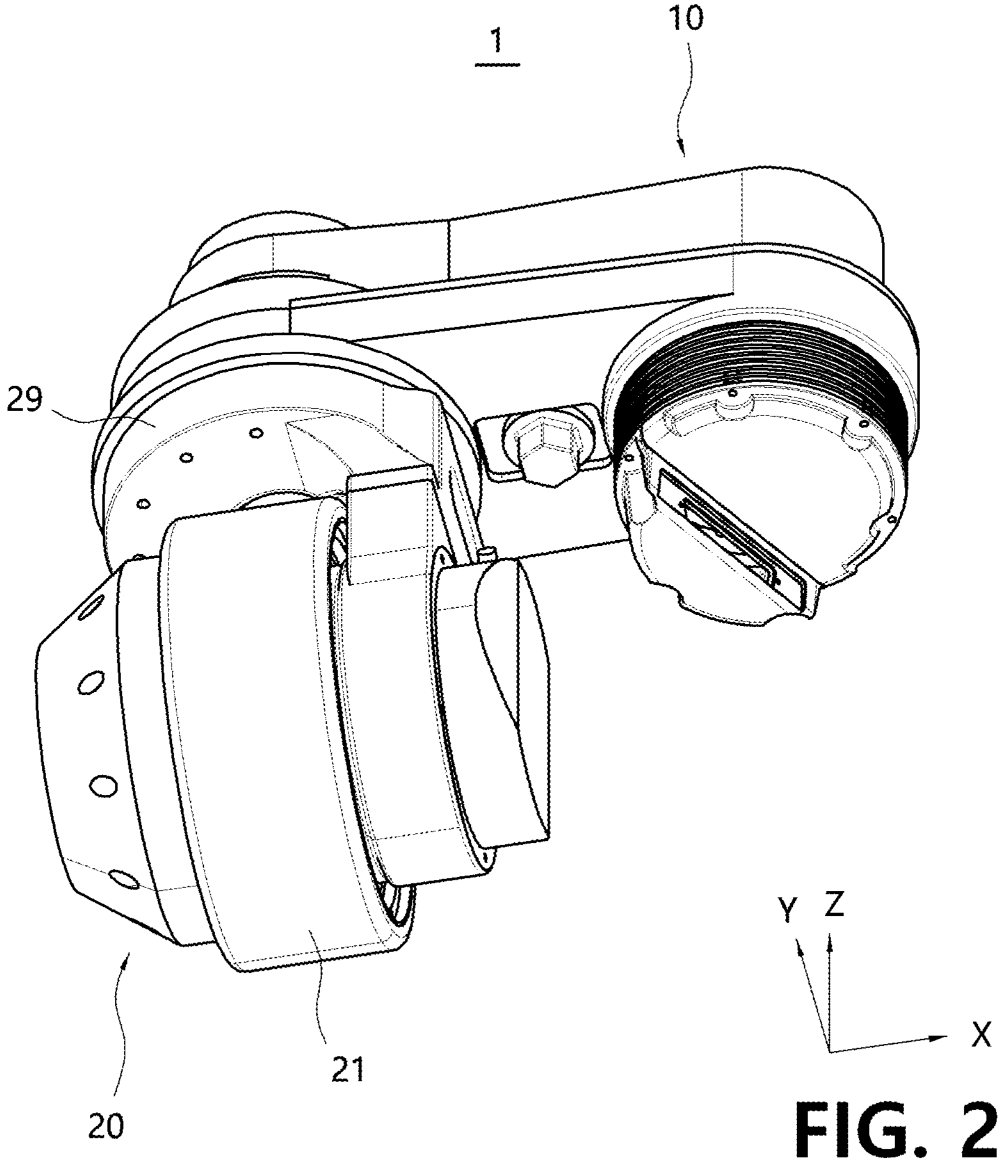
FIG. 2 is a perspective view of a corner module viewed from another direction according to an exemplary embodiment of the present disclosure.
Figure 3:
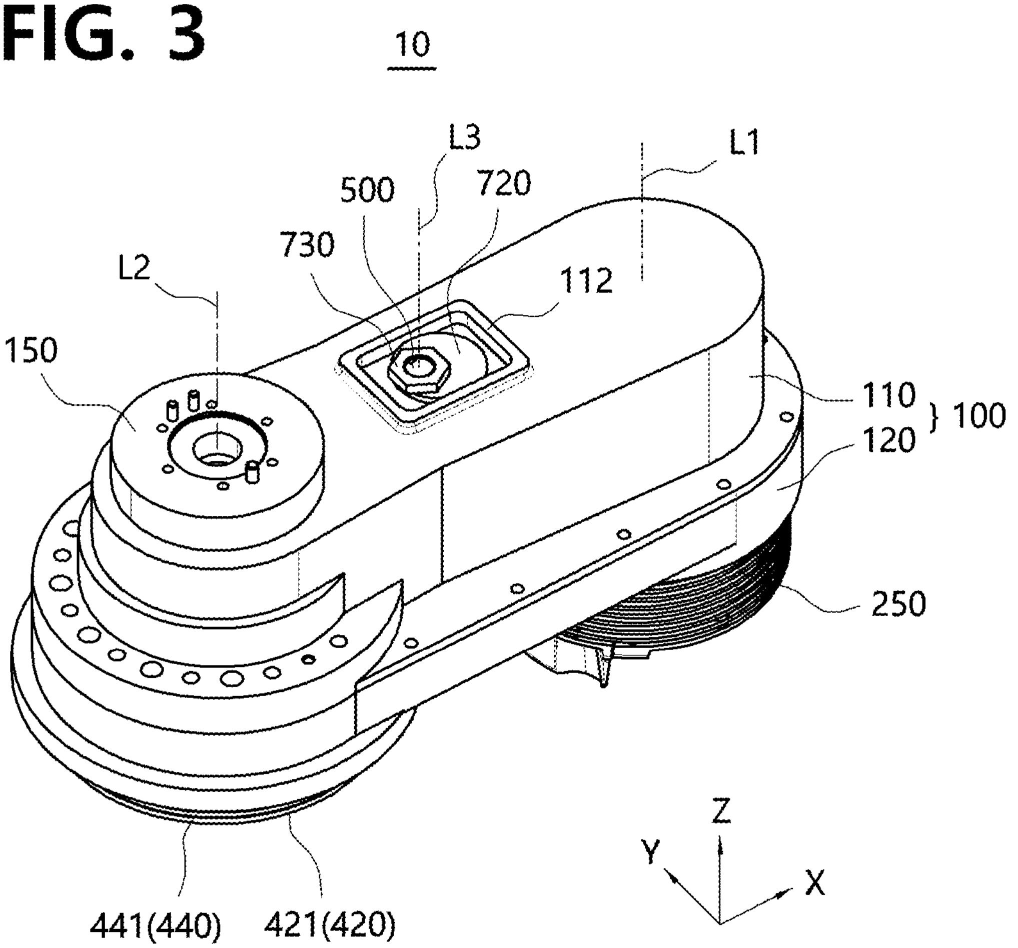
FIG. 3 is a perspective view of a steering device viewed from one direction according to an exemplary embodiment of the present disclosure.
Figure 4:
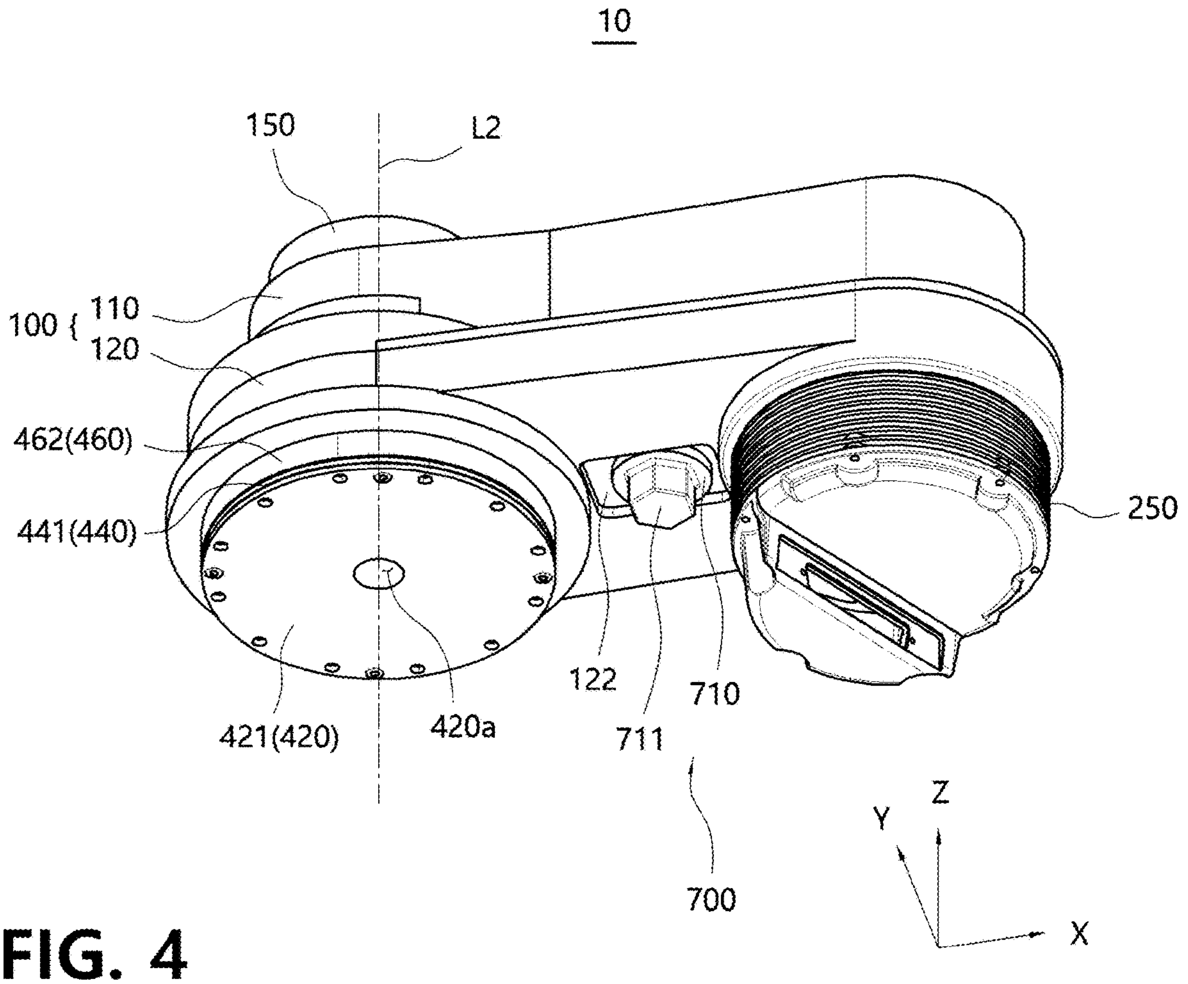
FIG. 4 is a perspective view of a steering device viewed from another direction according to an exemplary embodiment of the present disclosure.
Figure 5:
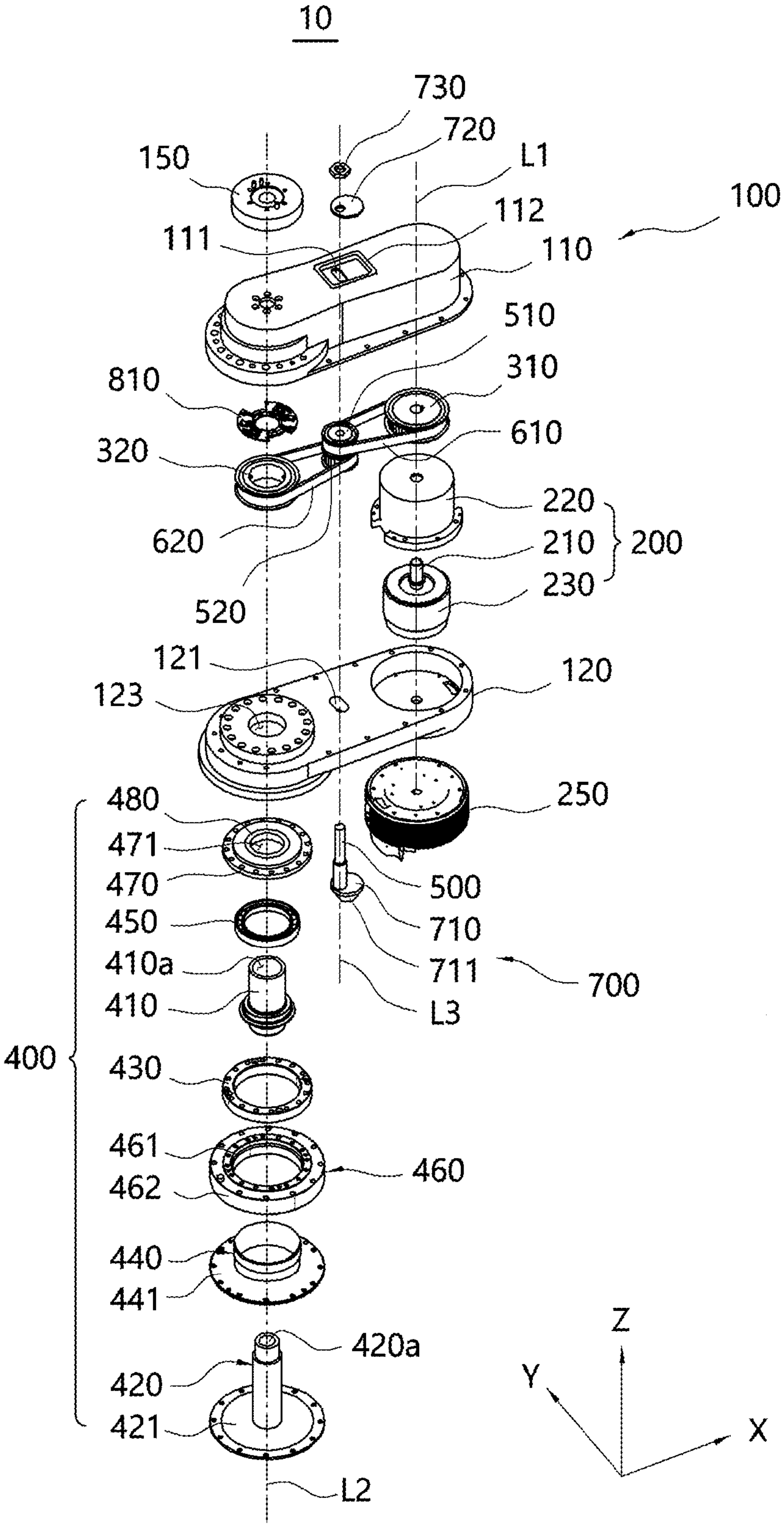
FIG. 5 is an exploded perspective view of a steering device according to an exemplary embodiment of the present disclosure.
Figure 6:
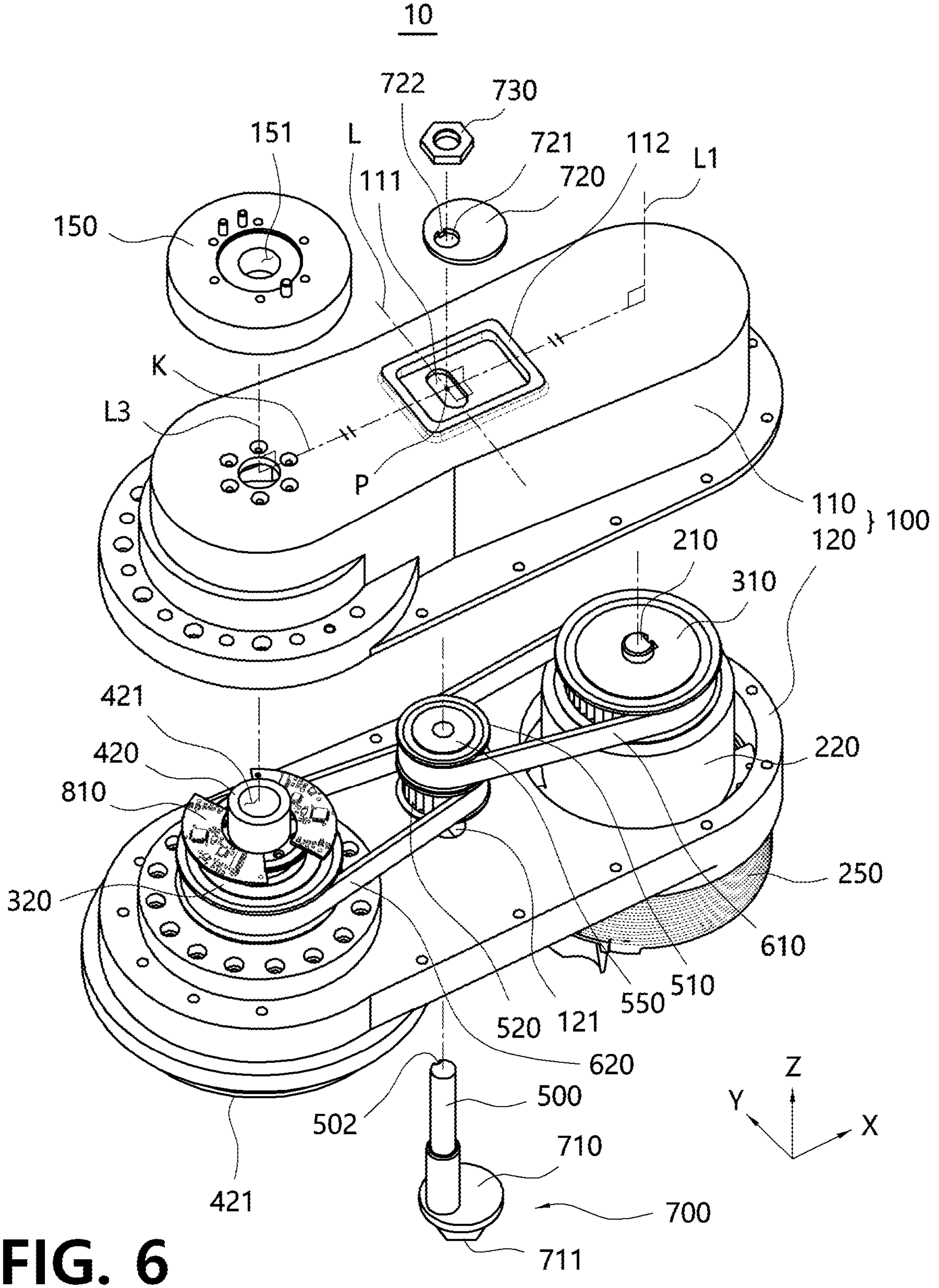
FIG. 6 is an exploded perspective view of a portion of a steering device according to an exemplary embodiment of the present disclosure.
Figure 7:
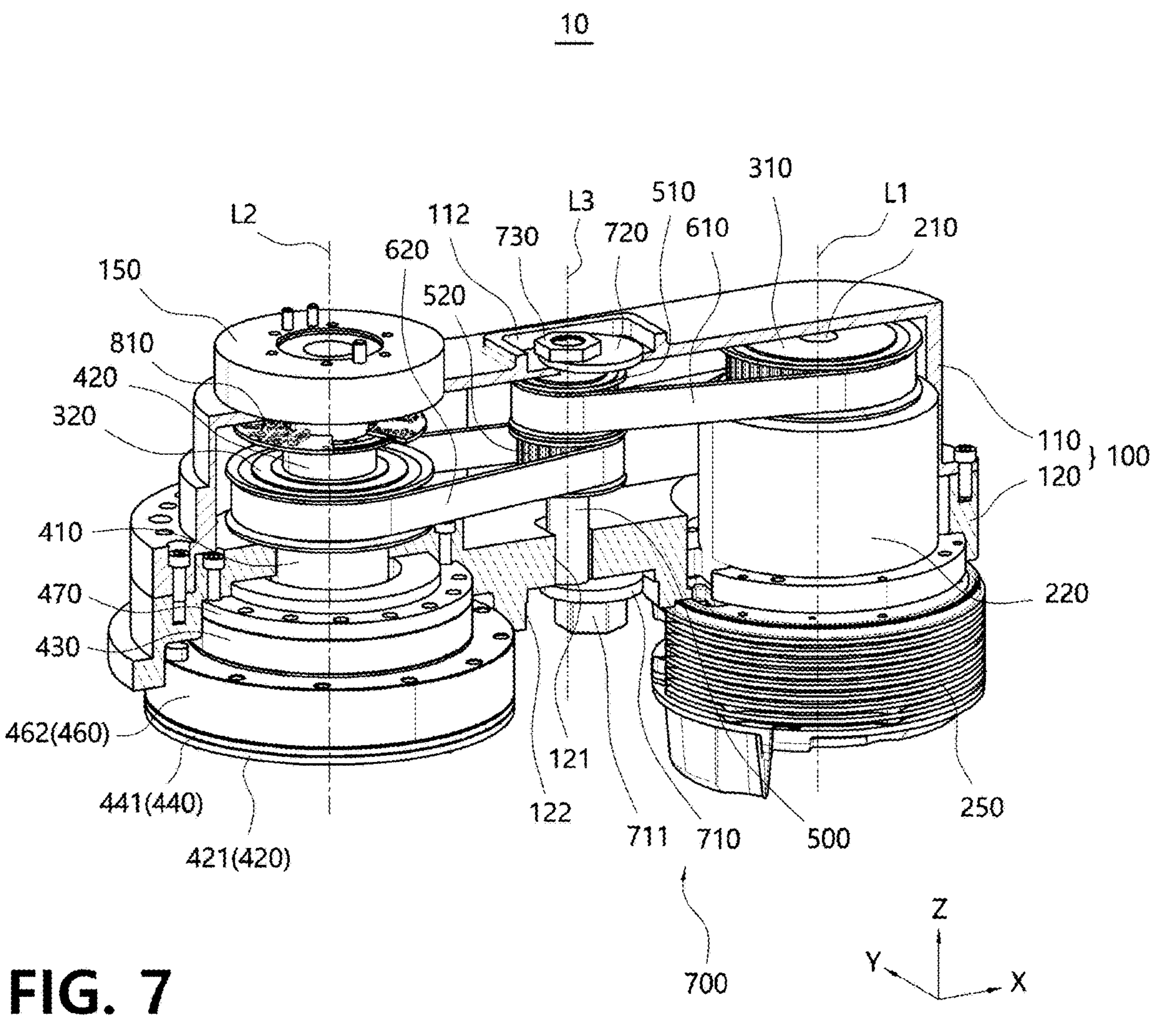
FIG. 7 is a cutaway perspective view of a portion of a steering device according to an exemplary embodiment of the present disclosure.
Figure 8:
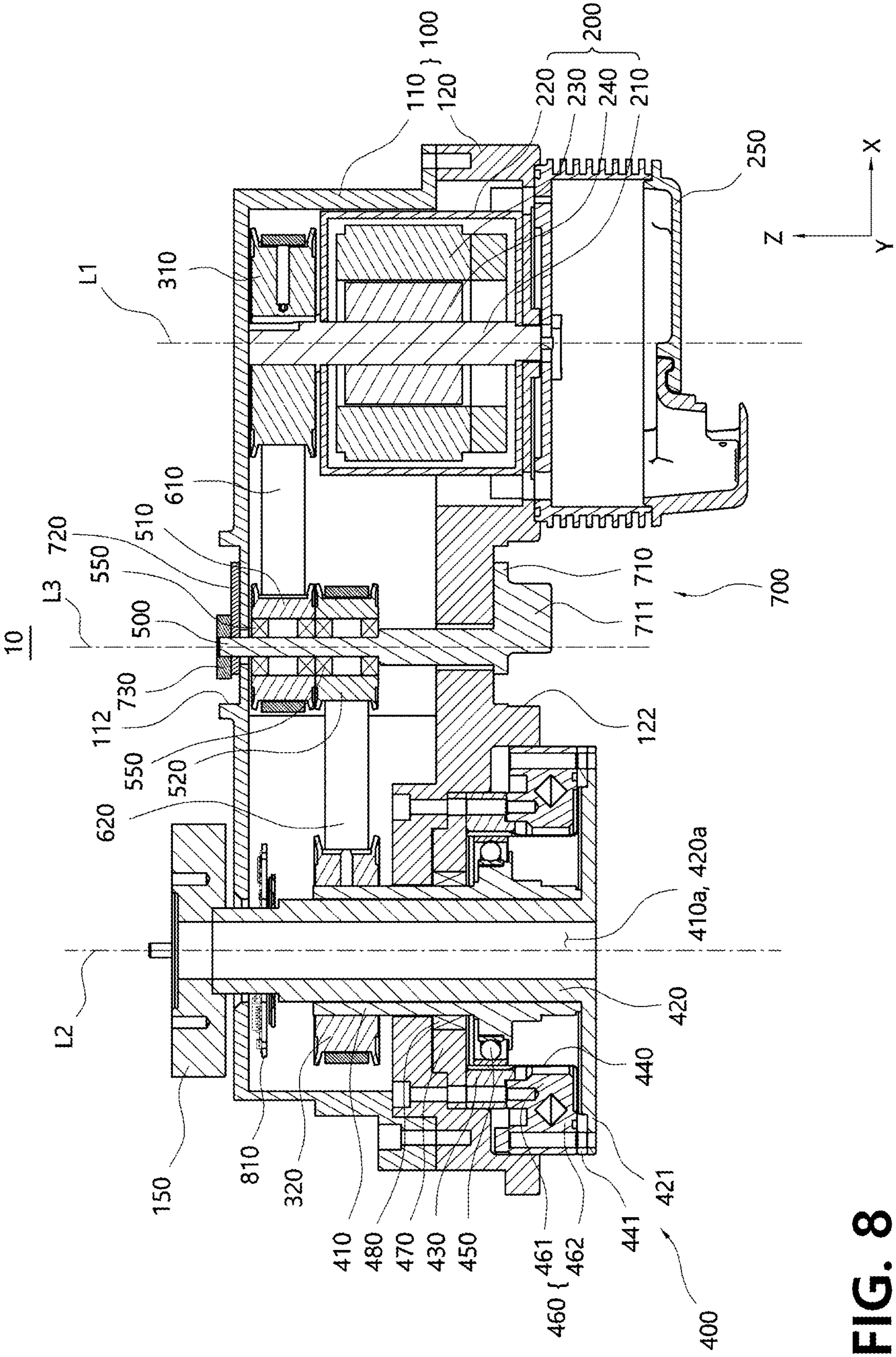
FIG. 8 is a cross-sectional view of a steering device according to an exemplary embodiment of the present disclosure.

FIG. 1 is a perspective view of a corner module viewed from one direction according to an exemplary embodiment of the present disclosure; FIG. 2 is a perspective view of a corner module viewed from another direction according to an exemplary embodiment of the present disclosure; FIG. 3 is a perspective view of a steering device viewed from one direction according to an exemplary embodiment of the present disclosure; FIG. 4 is a perspective view of a steering device viewed from another direction according to an exemplary embodiment of the present disclosure; FIG. 5 is an exploded perspective view of a steering device according to an exemplary embodiment of the present disclosure; FIG. 6 is an exploded perspective view of a portion of a steering device according to an exemplary embodiment of the present disclosure; FIG. 7 is a cutaway perspective view of a portion of a steering device according to an exemplary embodiment of the present disclosure; FIG. 8 is a cross-sectional view of a steering device according to an exemplary embodiment of the present disclosure.

In FIGS. 1 to 8, the −Z direction means a downward direction of a corner module 1 or a steering device 10. Here, the downward direction of the corner module 1 or the steering device 10 means a direction toward the ground where the wheel of the in-wheel drive device 20 contacts.

Referring to FIGS. 1 to 8, the corner module 1 according to the present embodiment includes a steering device 10 and an in-wheel drive device 20.

The steering device 10 according to the present embodiment includes a housing 100, a drive motor 200, a driving pulley 310, a speed reducer 400, a driven pulley 320, a first stage pulley 510, a second stage pulley 520, a first belt 610, and a second belt 620. This steering device 10 steers the in-wheel drive device 20 by rotating the in-wheel drive device 20 about the axis L2 of an output shaft 420 of the speed reducer 400.

In more detail, the housing 100 supports the drive motor 200, etc., which will be described later.

The housing 100 may include an upper housing 110 and a lower housing 120 that are coupled to each other. The upper housing 110 and the lower housing 120 may be detachably coupled to each other using a bolt connection method.

The housing 100 provides an internal space in which the driving pulley 310, the driven pulley 320, the first stage pulley 510, the second stage pulley 520, the first belt 610, the second belt 620, and the like are placed.

The drive motor 200 is supported by the housing 100 and includes a motor shaft 210. The motor shaft 210 extends up and down. The motor shaft 210 is arranged in parallel with an input shaft 410 of the speed reducer 400, which will be described later.

The drive motor 200 may include a motor shaft 210, a motor housing 220, a stator 230, and a rotor 240. The motor housing 220 may be disposed and supported inside the housing 100. The stator 230 and the rotor 240 are disposed inside the motor housing 220, and the rotor 240 is coupled to the motor shaft 210.

The driving pulley 310 is coupled to the motor shaft 210. The driving pulley 310 coupled to the motor shaft 210 rotates integrally with the motor shaft 210. The motor shaft 210 and the driving pulley 310 may be coupled to each other in a coupling manner using a key groove and a key, but are not limited thereto.

A cooler 250 may be disposed at a lower side of the housing 100 adjacent to the drive motor 200. The cooler 250 cools the heat of the drive motor 200. The cooler 250 may be an air-cooled cooler, but is not limited thereto.

The speed reducer 400 is supported on the housing 100. The speed reducer 400 includes an input shaft 410 and an output shaft 420 parallel to the motor shaft 210.

The speed reducer 400 receives power through the input shaft 410 and outputs power through the output shaft 420. In this case, the number of rotations or a rotation speed of the output shaft 420 may be smaller than the number of rotations or a rotation speed of the input shaft 410.

The input shaft 410 of the speed reducer 400 is disposed in parallel with the motor shaft 210. That is, the axis L2 of the input shaft 410 is parallel to the axis L1 of the motor shaft 210.

The output shaft 420 of the speed reducer 400 is disposed on the same axis as the input shaft 410. That is, the input shaft 410 and the output shaft 420 are disposed on the same axis L2.

In the present embodiment, the upper end of the input shaft 410 is located inside the housing 100. The input shaft 410 has a hollow shape, and the output shaft 420 is disposed in the hollow 410*a* of the input shaft 410 and extends upward through the upper opening of the input shaft 410.

A detailed description of the input shaft 410, the output shaft 420, and the speed reducer 400 including the same will be described later.

The driven pulley 320 is coupled to the input shaft 410. The coupled driven pulley 320 may rotate integrally with the input shaft 410. In this case, the driven pulley 320 may be coupled to the input shaft 410 in a coupling method using a key groove and a key.

The first stage pulley 510 and the second stage pulley 520 are adjacent up and down and coupled to a pulley shaft 500 parallel to the motor shaft 210 and the input shaft 410. The axis L3 of the pulley shaft 500 is parallel to the axis L1 of the motor shaft 210 and the axis L2 of the input shaft 410.

The pulley shaft 500 is disposed between the motor shaft 210 and the input shaft 410. The pulley shaft 500 is supported on the housing 100.

The pulley shaft 500 may be formed to have at least two or more portions having different cross-sectional areas in the extension direction (+Z direction).

For example, the cross-sectional area of the lower portion of the pulley shaft 500 may be formed to be larger than the cross-sectional area of the upper portion. In this case, a stepped portion may be formed at a boundary between the upper portion and the lower portion of the pulley shaft 500, and the second stage pulley 520 may be supported by being caught by the stepped portion of the pulley shaft 500.

However, although not illustrated, the pulley shaft may be formed to have the same cross-sectional area in the extension direction.

In the present embodiment, the first stage pulley 510 and the second stage pulley 520 rotate integrally.

For example, the first stage pulley 510 and the second stage pulley 520 may be integrally formed and coupled to the pulley shaft 500 to be relatively rotatable. In this case, the first stage pulley 510 and the second stage pulley 520 may be manufactured separately and then combined with each other by a bolting method or an adhesive method to be integrally formed. Alternatively, the first stage pulley 510 and the second stage pulley 520 may be integrally formed by a manufacturing method such as casting or injection.

A pulley bearing 550 for relative rotation may be interposed between the first stage pulley 510 and the pulley shaft 500 and the second stage pulley 520 and the pulley shaft 500.

As another example, although not shown, the first stage pulley and the second stage pulley may be fixedly coupled to the pulley shaft. In this case, the first stage pulley and the second stage pulley may be integrally formed and fixedly coupled to the pulley shaft, or may be formed separately and individually fixedly coupled to the pulley shaft. In this case, the first stage pulley and the second stage pulley may be fixedly coupled to the pulley shaft using a key groove and a key.

The first stage pulley and the second stage pulley may rotate integrally with the pulley shaft. In this case, the pulley shaft is rotatably supported by the housing.

In the present embodiment, the first belt 610 transmits power by connecting the driving pulley 310 and the first stage pulley 510, and the second belt 620 transmits power by connecting the second stage pulley 520 and the driven pulley 320.

The steering device 10 configured in this way operates such that the rotational driving force generated by the drive motor 200 is input to the input shaft 410 of the speed reducer 400 through the driving pulley 310, the first belt 610, the first stage pulley 510, the second stage pulley 520, the second belt 620, and the driven pulley 320 and is output through the output shaft 420 of the speed reducer 400 in a decelerated form.

According to the present embodiment, the axial distance (the distance between L1 and L3) between the pulley shaft 500 and the motor shaft 210 and the axial distance (the distance between L2 and L3) between the pulley shaft 500 and the input shaft 410 are the same.

In this case, when the driving pulley 310, the first belt 610, the first stage pulley 510, the second stage pulley 520, the second belt 620, and the driven pulley 320 satisfy a predetermined condition, the tension applied to the first belt 610 and the second belt 620 may be the same.

For example, if the driving pulley 310, the first stage pulley 510, the second stage pulley 520, and the driven pulley 320 all have the same shape and material, and the first belt 610 and the second belt 620 have the same shape and material, and the axial distance between the pulley shaft 500 and the motor shaft 210 and the axial distance between the pulley shaft 500 and the input shaft 410 are the same, the tension applied to the first belt 610 and the second belt 620 may be the same.

Alternatively, if the driving pulley 310 and the driven pulley 320 have the same shape and material, and the first stage pulley 510 and the second stage pulley 520 have the same shape and material, and the first belt 610 and the second belt 620 have the same shape and material, and the axial distance between the pulley shaft 500 and the motor shaft 210 and the axial distance between the pulley shaft 500 and the input shaft 410 are the same, the tension applied to the first belt 610 and the second belt 620 may be the same.

Alternatively, if the driving pulley 310 and the second stage pulley 520 have the same shape and material, and the first stage pulley 510 and the driven pulley 320 have the same shape and material, and the first belt 610 and the second belt 620 have the same shape and material, and the axial distance between the pulley shaft 500 and the motor shaft 210 and the axial distance between the pulley shaft 500 and the input shaft 410 are the same, the tension applied to the first belt 610 and the second belt 620 may be the same.

In this way, when the tension applied to the first belt 610 and the second belt 620 is maintained the same, the driving pulley 310 and the driven pulley 320 may rotate in a balanced and stable manner.

In the present embodiment, the driving pulley 310, the first stage pulley 510, the second stage pulley 520, and the driven pulley 320 may be provided as timing pulleys, and the first belt 610 and the second belt 620 may be provided as timing belts. For reference, gear teeth are not shown in the first belt 610 and the second belt 620 shown in FIG. 5 and the like.

According to the present embodiment, the first stage pulley 510 and the second stage pulley 520 that are arranged up and down adjacent to each other and rotate integrally are used to transmit power from the motor shaft 210 to the input shaft 410.

In this case, the distance between the second belt 620 corresponding to the second stage pulley 520 located below the first stage pulley 510 and the upper wall of the housing 100 is greater than the distance between the first belt 610 corresponding to the first stage pulley 510 located above the second stage pulley 520 and the upper wall of the housing 100.

In this case, the driven pulley 320 connected to the second belt 620 is located below the driving pulley 310 connected to the first belt 610, so that the space above the driven pulley 320 is relatively wide.

As a comparative example compared to the present embodiment, assuming an example that the size of the housing and the size of the drive motor are the same as those of the present embodiment, but the driving pulley coupled to the motor shaft of the drive motor and the driven pulley coupled to the input shaft of the speed reducer are simply connected by a single belt, in this comparative example, the distance between the driving pulley, the driven pulley, or the single belt and the upper wall of the housing is the same. That is, in the comparative example, the space between the driving pulley and the upper wall of the housing, between the driven pulley and the upper wall of the housing, and between the single belt and the upper wall of the housing are all formed narrow.

Therefore, the steering device 10 according to the present embodiment uses the first stage pulley 510 and the second stage pulley 520, which are arranged adjacent up and down to each other and rotate integrally to transmit power from the motor shaft 210 to the input shaft 410, thereby widening the space above the second belt 620 or the driven pulley 320, and making it easy to install devices or components such as an encoder 810 in the space.

In another aspect, the space below the first belt 610 in the housing 100 is widened, thereby improving space utilization and facilitating the installation of various devices or components in the space.

According to the present embodiment, the input shaft 410 is located in the inner space of the housing 100 in a state in which the upper end thereof is spaced apart from the upper wall of the housing 100. In this case, the upper end of the input shaft 410 does not protrude upward from the upper surface of the driven pulley 320. In this case, space utilization of the space above the driven pulley 320 or the input shaft 410 may be improved.

According to the present embodiment, the input shaft 410 has a hollow shape, and the output shaft 420 is disposed coaxially with the input shaft 410 in the hollow 410*a* of the input shaft 410. An encoder 810 is installed at the upper end of the output shaft 420 protruding upward from the upper opening of the input shaft 410. The encoder 810 may be easily installed because the space above the second belt 620 is large. According to the present embodiment, the output shaft 420 protruding upward from the upper opening of the input shaft 410 has a hollow shape. The upper end of the output shaft 420 may protrude through the upper wall of the housing 100. A cable support member 150 may be coupled to the upper end of the output shaft 420 protruding from the housing 100. The cable support member 150 may have a disk shape, and a hollow 151 may be formed in the center thereof.

A cable (not shown) for providing a current to the drive motor 200 of the steering device 10 or the motor (not shown) of the in-wheel drive device 20 may extend below the steering device 10 through the hollow 151 of the cable support member 150 and the hollow 420*a* of the output shaft 420.

Referring to FIGS. 5 and 6, a first through hole 111 through which the upper end of the pulley shaft 500 passes may be formed on the upper wall of the housing 100, and a second through hole 121 through which the lower end of the pulley shaft 500 passes may be formed on the lower wall of the housing 100.

The first through hole 111 and the second through hole 121 may have a long hole shape.

When the pulley shaft 500 moves along the first through hole 111 and the second through hole 121, the tension applied to the first belt 610 and the second belt 620 may be changed. The first through hole 111 and the second through hole 121 having a long hole shape may extend in a straight line, extend in a zigzag shape, extend in a curve, or extend in various other shapes. When the extension directions of the first through hole 111 and the second through hole 121 are changed, the pulley shaft 500 may be changed in position along various trajectories, and the tension applied to the first belt 610 and the second belt 620 may be changed in various aspects.

Referring to FIG. 6, the first through hole 111 and the second through hole 121 may pass through the center P of the line segment K that vertically meets the axis L1 of the motor shaft 210 and the axis L2 of the input shaft 410, which are parallel to each other, and may be formed to extend along a straight line L orthogonal to the pulley shaft 500 and the line segment K.

When the pulley shaft 500 moves along the first through hole 111 and the second through hole 121 extending along the straight line L, the magnitude of the tension applied to the first belt 610 and the second belt 620 changes, but the axial distance between the pulley shaft 500 and the input shaft 410 and the axial distance between the pulley shaft 500 and the motor shaft 210 remain the same.

Figure 9:
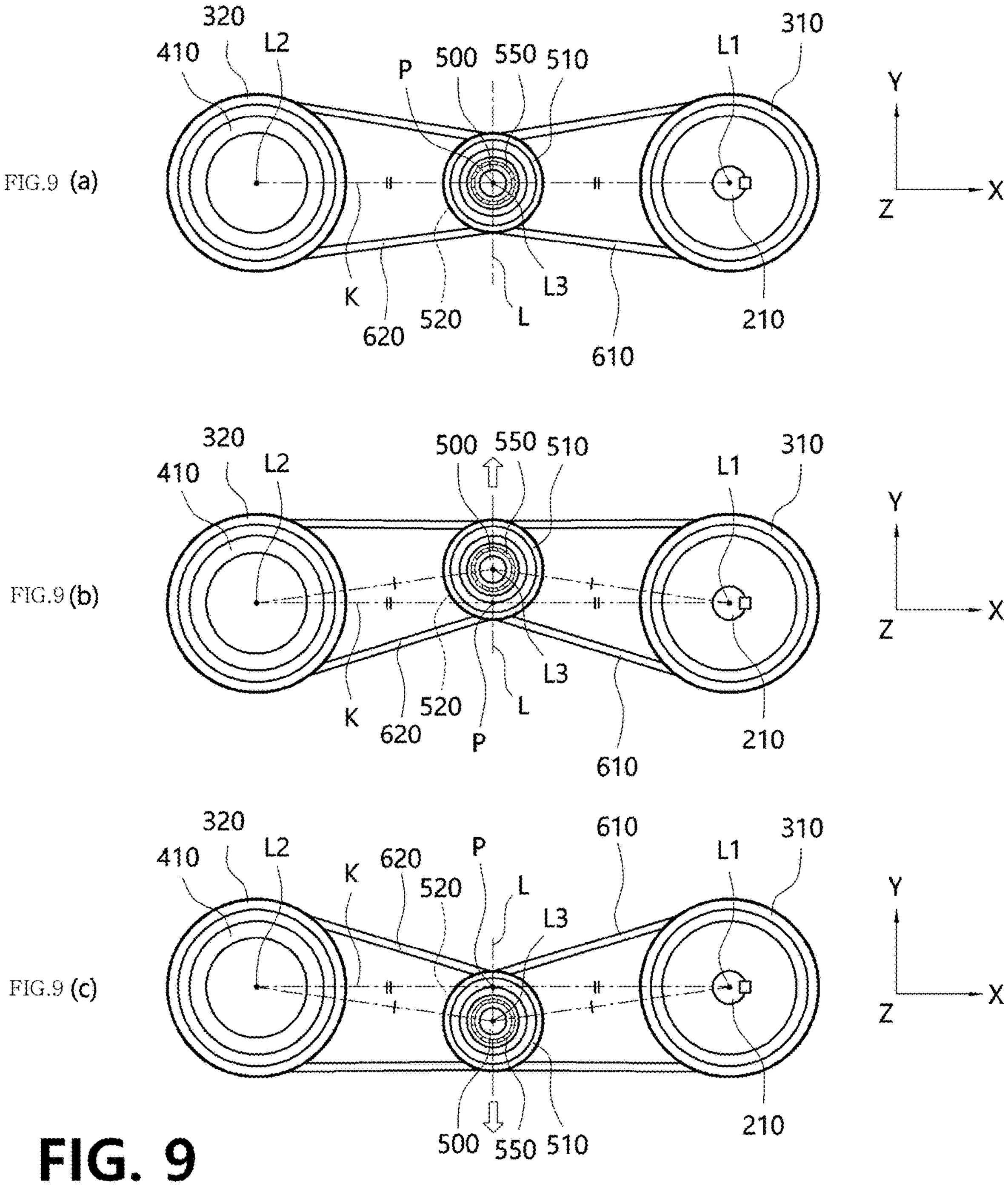
FIG. 9 is a view for describing a relationship between a movement of a pulley shaft and an axial distance of a pulley shaft and a motor shaft and an axial distance of a pulley shaft and an input shaft according to an exemplary embodiment of the present disclosure.

In this regard, FIG. 9 is a view for describing a relationship between a movement of a pulley shaft and an axial distance of a pulley shaft and a motor shaft and an axial distance of a pulley shaft and an input shaft according to an exemplary embodiment of the present disclosure. For reference, in FIG. 9, the output shaft (see 420 in FIG. 6) disposed in the hollow of the input shaft 410 is omitted.

Hereinafter, a relationship between a movement of a pulley shaft and an axial distance of a pulley shaft and a motor shaft and an axial distance of a pulley shaft and an input shaft will be described with reference to FIGS. 6 and 9.

Referring to FIG. 6 and FIG. 9(*a*), in an initial state, the pulley shaft 500 is placed at a position where the axis L3 of the pulley shaft 500 coincides with the center P of the line segment K. In this case, the axial distance between the pulley shaft 500 and the input shaft 410 (i.e., the distance between L3 and L2) and the axial distance between the pulley shaft 500 and the motor shaft 210 (i.e., the distance between L3 and L1) are the same.

Referring to FIGS. 6 and 9(*b*), the position of the pulley shaft 500 may be changed in one direction (+Y direction) along the first through hole 111 and the second through hole 121. At this time, the axis L3 of the pulley shaft 500 placed at the center P of the line segment K moves in one direction (+Y direction).

Even in this case, the axial distance between the pulley shaft 500 and the input shaft 410 (i.e., the distance between L2 and L3) and the axial distance between the pulley shaft 500 and the motor shaft 210 (i.e., the distance between L1 and L3) are the same. However, the magnitude of the tension applied to the first belt 610 and the second belt 610 in FIG. 9(*b*) may be different from the magnitude of the tension applied to the first belt 610 and the second belt 610 in FIG. 9(*a*).

Referring to FIGS. 6 and 9(*c*), the position of the pulley shaft 500 may be changed in the other direction (−Y direction) along the first through hole 111 and the second through hole 121. At this time, the axis L3 of the pulley shaft 500 placed at the center P of the line segment K moves in one direction (−Y direction).

Even in this case, the axial distance between the pulley shaft 500 and the input shaft 410 (i.e., the distance between L3 and L2) and the axial distance between the pulley shaft 500 and the motor shaft 210 (i.e., the distance between L3 and L1) are the same. However, the magnitude of the tension applied to the first belt 610 and the second belt 610 in FIG. 9(*c*) may be different from the magnitude of the tension applied to the first belt 610 and the second belt 610 in FIG. 9(*a*).

Therefore, when the pulley shaft 500 changes its position along the first through hole 111 and the second through hole 121 extending along the straight line L, the tension applied to the first belt 610 and the second belt 620 can be adjusted, and the tension can be maintained the same, allowing the steering device 10 to operate in a balanced and stable manner. Referring to FIGS. 3 to 8, the pulley shaft 500 may form a part of a cam bolt assembly 700.

The cam bolt assembly 700 may include a pulley shaft 500, an integrated cam plate 710, a detachable cam plate 720, and a nut 730.

The pulley shaft 500 is supported on the housing 100. The upper end and the lower end of the pulley shaft 500 each penetrate the housing 100 and are exposed to the outside. The first stage pulley 510 and the second stage pulley 520 may be rotatably coupled to the pulley shaft 500.

The integrated cam plate 710 is formed integrally by being eccentric at the lower end of the pulley shaft 500 exposed to the outside through the housing 100, and is supported by the lower side of the housing 100.

The detachable cam plate 720 is eccentrically coupled to the upper end of the pulley shaft 500 exposed to the outside through the housing 100, and is supported by the upper side of the housing 100. A through hole 721 through which the upper end of the pulley shaft 500 passes is formed in the detachable cam plate 720.

A protrusion 722 may be formed on the inner circumferential surface of the through hole 721 of the detachable cam plate 720 to prevent the pulley shaft 500 passing through the detachable cam plate 720 from rotating relative to the detachable cam plate 720, and an insertion groove 502 into which the protrusion 722 of the detachable cam plate 720 is inserted may be formed at the upper end of the pulley shaft 500.

The nut 730 may be coupled to the upper end of the pulley shaft 500 to closely contact the detachable cam plate 720 with the upper side of the housing 100.

However, although not illustrated, of course, the integrated cam plate may be integrally formed by being eccentric at the upper end of the pulley shaft, and the detachable cam plate may be eccentrically coupled to the lower end of the pulley shaft.

According to the present embodiment, a bolt head 711 may be formed on one surface of the integrated cam plate 710. In this case, the bolt head 711 may be formed in the central area of the integrated cam plate 710. The bolt head 711 may be rotated by a torque wrench, etc.

The pulley shaft 500, the integrated cam plate 710, and the bolt head 711 may be integrally formed, and when the bolt head 711 rotates, the integrated cam plate 710, the pulley shaft 500, and the detachable cam plate 720 also rotate. In this case, the pulley shaft 500 may move along the first through hole 111 and the second through hole 121 having a long hole shape.

A first cam guide portion 112 in which the detachable cam plate 720 is rotatably seated may be formed around the first through hole 111 of the housing 100, and a second cam guide portion 122 in which the integrated cam plate 710 is rotatably seated may be formed around the second through hole 121 of the housing 100.

The detachable cam plate 720 may rotate while being seated in the first cam guide portion 112. In other words, the detachable cam plate 720 does not get out of the first cam guide portion 112 while rotating.

The integrated cam plate 710 may rotate while being seated in the second cam guide portion 122. In other words, the integrated cam plate 710 does not get out of the second cam guide portion 122 while rotating.

Figure 10:
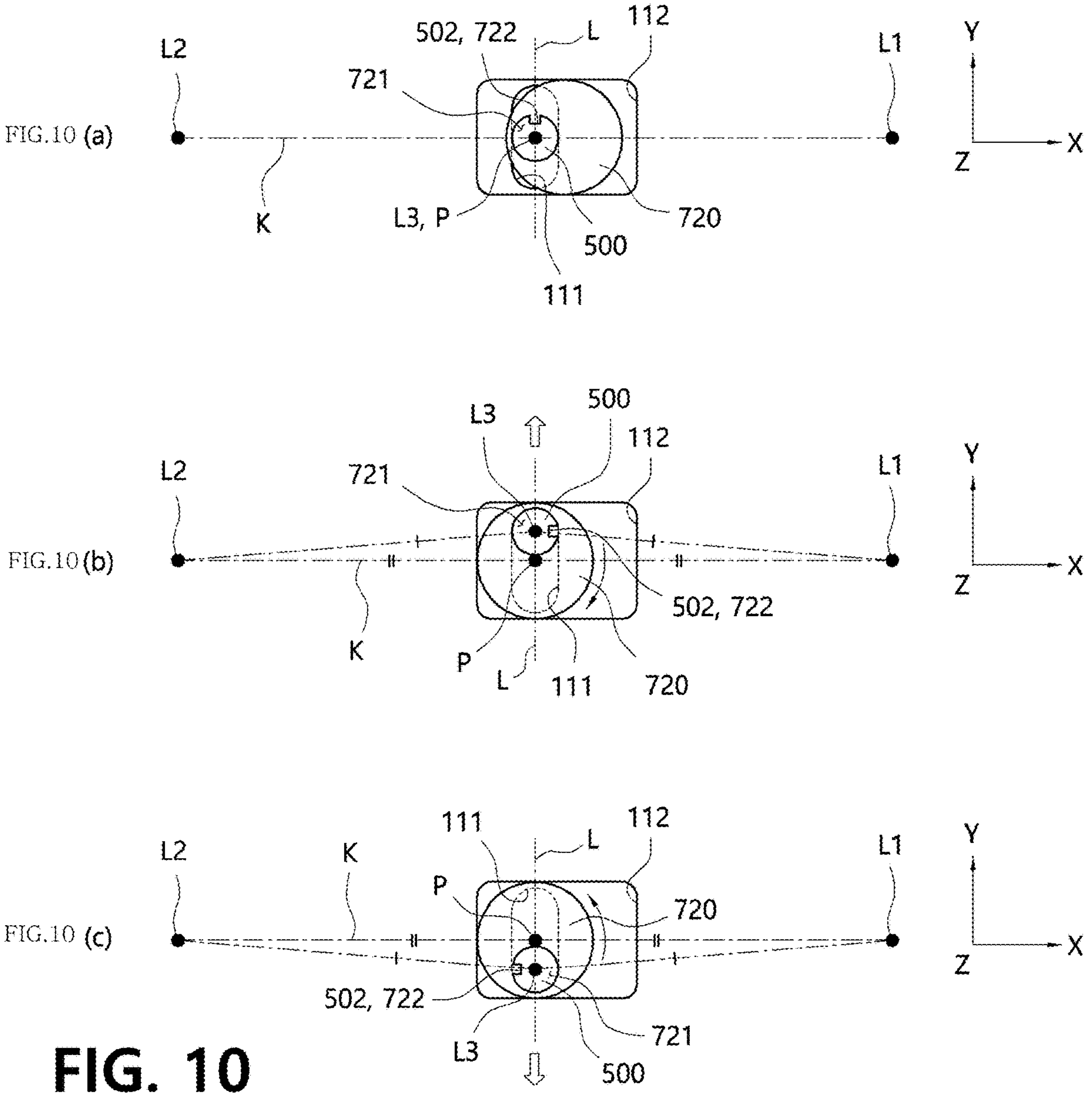
FIG. 10 is a view for describing an operation of a cam bolt assembly according to an exemplary embodiment of the present disclosure.

FIG. 10 is a view for describing an operation of a cam bolt assembly according to an exemplary embodiment of the present disclosure. For reference, only the pulley shaft 500, the first through hole 111, the detachable cam plate 720, and the first cam guide portion 112 are shown in FIG. 10.

Referring to FIG. 10(*a*), in an initial state, the pulley shaft 500 is placed at a position where the axis L3 of the pulley shaft 500 coincides with the center P of the line segment K in the first through hole 111. In this case, the pulley shaft 500 is coupled in a state of passing through the through hole 721 of the detachable cam plate 720. In addition, the pulley shaft 500 is coupled to the detachable cam plate 720 with the protrusion 722 formed on the inner circumferential surface of the through hole 721 inserted into the insertion groove 502 of the pulley shaft 500.

Referring to FIG. 10(*b*), when the bolt head (see 711 in FIG. 7) is rotated in one direction by a torque wrench or the like, the detachable cam plate 720 and the pulley shaft 500 coupled in a form in which the protrusion 722 is inserted into the insertion groove 502 may rotate in the one direction together.

At this time, the detachable cam plate 720 rotates in one direction within the first cam guide portion 112, and the pulley shaft 500 eccentrically coupled to the detachable cam plate 720 may move in one direction (+Y direction) along the first through hole 111.

Referring to FIG. 10(*c*), when the bolt head (see 711 in FIG. 7) is rotated in the other direction by a torque wrench or the like, the detachable cam plate 720 and the pulley shaft 500 coupled in a form in which the protrusion 722 is inserted into the insertion groove 502 may rotate in the other direction together.

At this time, the detachable cam plate 720 rotates in one direction within the first cam guide portion 112, and the pulley shaft 500 eccentrically coupled to the detachable cam plate 720 may move in the other direction (−Y direction) along the first through hole 111.

For reference, the relationship between the pulley shaft 500, the first through hole 111, the detachable cam plate 720, and the first cam guide portion 112 described above may be equally applied to the pulley shaft 500, the second through hole (see 121 in FIGS. 5 and 7), the integrated cam plate (see 710 in FIGS. 5 and 7), and the second cam guide portion (see 122 in FIG. 7). As described above, when the cam bolt assembly 700 including the pulley shaft 500 is used, with only a simple operation of rotating the bolt head 711 using a torque wrench or the like, the detachable cam plate 720 and the integrated cam plate 710 are stably rotated by the first cam guide portion 112 and the second cam guide portion 122, and accordingly, the pulley shaft 500 may move along the first through hole 111 and the second through hole 121 having a long hole shape, so that the tension applied to the first belt 610 and the second belt 620 may be easily adjusted.

Referring to FIGS. 1 to 8, according to the present embodiment, the speed reducer 400 may be a harmonic drive-type speed reducer.

The speed reducer 400 may include an input shaft 410, a circular spline 430, a flex spline 440, a wave generator 450, and an output shaft 420.

The input shaft 410 has a hollow shape and is exposed downward through the housing 100.

A through hole 123 through which the input shaft 410 penetrates downward may be formed in the housing 100. A bearing (not shown) may be disposed in the through hole 123 to allow the input shaft 410 to rotate relative to the housing 100.

The circular spline 430 has a ring shape and internal teeth are formed on the inner circumferential surface. The circular spline 430 is supported on the lower side of the housing 100 in a form surrounding the input shaft exposed downward from the housing 100.

The flex spline 440 has a hollow shape, and external teeth that engage with the internal teeth of the circular spline 430 are formed on the outer circumferential surface. The flex spline 440 is disposed inside the circular spline 430.

The wave generator 450 is disposed in the hollow of the flex spline 440 to induce the external teeth of the flex spline 440 to engage with the external teeth of the circular spline 430. The input shaft is coupled through the center of the wave generator 450.

The operating mechanism of the harmonic drive-type speed reducer, which includes circular spline, flex spline, and wave generator, is the same as is known. For example, when the wave generator 450 rotates while the circular spline 430 is fixed, the flex spline 440 rotates in a direction opposite to the rotation direction of the wave generator 450. In this case, the number of rotations of the flex spline 440 is less than the number of rotations of the wave generator 450.

However, in the present embodiment, there is a difference from the harmonic drive-type speed reducer known in the shape, arrangement or the like of the input shaft 410 and the output shaft 420.

The output shaft 420 is disposed in the hollow 210*a* of the input shaft 410 to have the same axis L3 as the input shaft 410. In this case, the output shaft 420 may have a hollow shape.

The lower end of the output shaft 420 may be coupled to the lower end of the flex spline 440.

An output shaft bearing 460 supports the output shaft 420 and the flex spline 440 so as to be relatively rotatable with respect to the circular spline 430 supported on the housing 100. The output shaft bearing 460 may be a cross roller-type bearing, but is not limited thereto.

In order to facilitate coupling between the output shaft 420 and the output shaft bearing 460, an output shaft extension part 421 extending in a direction perpendicular to the axis L2 of the output shaft 420 may be formed at the lower end of the output shaft 420, and a flex spline extension part 441 extending in a direction perpendicular to the axis L2 of the input shaft 410 may be formed at the lower end of the flex spline 440. The output shaft extension part 421 and the flex spline extension part 441 may be coupled to each other, and the output shaft 420 and the flex spline 440 may rotate together.

An outer wheel 462 of the output shaft bearing 460 is coupled to the flex spline extension part 441 and the output shaft extension part 421. In addition, an inner wheel 461 of the output shaft bearing 460 is coupled to the lower side of the circular spline 430 supported on the housing 100.

The speed reducer 400 may further include a cover member 470. The cover member 470 has a ring shape through which the input shaft 410 passes. The cover member 470 is coupled to the upper side of the circular spline 430 and is supported by the lower side of the housing 100.

An input shaft bearing 480 that induces relative rotation of the input shaft 410 and the cover member 470 may be disposed in the through hole 471 of the cover member 470 through which the input shaft 410 passes. The input shaft 410 may be rotatably supported on the housing 100 via the cover member 470 supported on the housing 100.

The steering device 10 according to the present embodiment discussed above uses the first stage pulley 510 and the second stage pulley 520, which are arranged adjacent up and down to each other and rotate integrally to transmit power from the motor shaft 210 to the input shaft 410, thereby widening the space above the second belt 620 or the driven pulley 320, and making it easy to install devices or components such as an encoder 810 in the space.

Furthermore, the pulley shaft 500 may be changed in position along the first through hole 111 and the second through hole 121 extending in a long hole shape, and accordingly, the tension applied to the first belt 610 and the second belt 620 may be adjusted.

Furthermore, the first through hole 111 and the second through hole 121 pass through the center P of the line segment K, which vertically meets the axis L1 of the motor shaft 210 and the axis L2 of the input shaft 410, but extends along a straight line L orthogonal to both the pulley shaft 500 and the line segment K, whereby when the pulley shaft 500 changes its position along the first through hole 111 and the second through hole 121, it is possible to adjust the tension applied to the first belt 610 and the second belt 620 and maintain the same, thereby enabling a balanced and stable operation of the steering device 10.

Referring to FIGS. 1 to 4, the in-wheel drive device 20 according to the present embodiment is coupled to the output shaft 420 of the steering device 10. The in-wheel drive device 20 has a structure in which power is directly transmitted to the wheel by a motor (not shown) disposed inside the wheel 21 so that the wheel rotates.

For example, the in-wheel drive device 20 may have a known configuration including a cylindrical wheel 21, a motor (not shown) that generates a rotational force, a speed reducer (not shown) that decelerates the rotational force generated by the motor and transmits it to the wheel 21, and a brake (not shown) for braking the wheel 21, and a description thereof is omitted.

A coupling member 29 coupled to the steering device 10 may be formed in the in-wheel drive device 20. The coupling member 29 is coupled to the output shaft 420. In this case, a concave seating groove portion in which the output shaft 420 is seated may be formed in the coupling member 29, and the output shaft extension part 421 may be bolted to the coupling member 29 in surface contact with the bottom surface of the seating groove portion.

As above, the corner module 1, including the steering device 10 and the in-wheel drive device 20, is mounted on a moving apparatus that uses electricity as a power source, such as a vehicle moving robot to move a vehicle in a narrow space such as a parking lot.

The moving apparatus equipped with the corner module 1 may move by the in-wheel drive device 20 of the corner module 1 and change its direction by the steering device 10 of the corner module 1.

According to the above configuration, the steering device according to an aspect of the present disclosure uses the first stage pulley and the second stage pulley that are placed up and down adjacent to each other and integrally rotate to transmit power from the motor shaft to the input shaft, thereby widening the space above the second belt or the driven pulley, and making it easy to install devices or components such as encoders in the space.

Furthermore, the pulley shaft can be changed in position along the first through hole and the second through hole extending in a long hole shape, and accordingly, the tension applied to the first belt and the second belt can be adjusted.

Furthermore, the first through hole and the second through hole pass through the center of the line segment, which vertically meets the axis of the motor shaft and the axis of the input shaft, but extends along a straight line orthogonal to both the pulley shaft and the line segment, whereby when the pulley shaft changes its position along the first through hole and the second through hole, it is possible to adjust the tension applied to the first belt and the second belt and maintain the same, thereby enabling a balanced and stable operation of the steering device.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. A steering device for steering an in-wheel drive device, comprising:

a housing;

a drive motor supported on the housing and having a motor shaft extending up and down;

a driving pulley coupled to the motor shaft;

a speed reducer including an input shaft parallel to the motor shaft and an output shaft arranged coaxially with the input shaft and coupled to the in-wheel drive device;

a driven pulley coupled to the input shaft;

a first stage pulley and a second stage pulley that are adjacently coupled up and down to a pulley shaft parallel to the motor shaft and the input shaft and rotate integrally;

a first belt connecting the driving pulley and the first stage pulley to transmit power; and a second belt connecting the second stage pulley and the driven pulley to transmit power.

2. The steering device of claim 1, wherein the pulley shaft is disposed between the motor shaft and the input shaft.

3. The steering device of claim 1, wherein the first stage pulley and the second stage pulley are manufactured integrally.

4. The steering device of claim 1, wherein the first stage pulley and the second stage pulley are rotatably supported on the pulley shaft.

5. The steering device of claim 1, wherein the driving pulley, the driven pulley, the first stage pulley, the second stage pulley, the first belt, and the second belt are disposed in the internal space of the housing, and the gap between the second belt and an upper wall of the housing is greater than the gap between the first belt and the upper wall of the housing.

6. The steering device of claim 5, wherein an upper end of the input shaft is spaced apart from the upper wall of the housing and is located in the internal space of the housing.

7. The steering device of claim 6, wherein the upper end of the input shaft does not protrude upward from the upper surface of the driven pulley.

8. The steering device of claim 6, wherein the input shaft has a hollow shape, the output shaft is disposed in the hollow of the input shaft, and an encoder is installed on the upper end of the output shaft that protrudes upward from the upper opening of the input shaft.

9. The steering device of claim 8, wherein the output shaft has a hollow shape, and the upper end of the output shaft protrudes through the upper wall of the housing, and a cable support member is coupled to the upper end of the output shaft protruding through the upper wall of the housing.

10. The steering device of claim 1, wherein the axial distance between the pulley shaft and the motor shaft and the axial distance between the pulley shaft and the input shaft are the same.

11. The steering device of claim 1, wherein a first through hole and a second through hole are formed in the housing through which the upper end and the lower end of the pulley shaft respectively pass, the first through hole and the second through hole have a long hole shape, and when the pulley shaft changes its position along the first through hole and the second through hole, the tension applied to the first belt and the second belt changes.

12. The steering device of claim 11, wherein the first through hole and the second through hole pass through a center of a line segment that vertically meets an axis of the motor shaft and an axis of the input shaft, and have a long hole shape extending along a straight line orthogonal to the axis of the pulley shaft and the line segment, and even when the pulley shaft is changed in position along the first through hole and the second through hole, the axial distance between the pulley shaft and the input shaft and the axial distance between the pulley shaft and the motor shaft remain the same.

13. The steering device of claim 12, wherein the pulley shaft constitutes part of a cam bolt assembly, wherein the cam bolt assembly comprises:

the pulley shaft;

an integrated cam plate formed eccentrically at one of the upper end and the lower end of the pulley shaft that is exposed to the outside by penetrating the housing, and is supported on the housing;

a detachable cam plate eccentrically coupled to the other one of the upper end and the lower end of the pulley shaft that is exposed to the outside by penetrating the housing, and is supported on the housing; and a nut coupled to an end of the pulley shaft coupled to the detachable cam plate to closely contact the detachable cam plate with the housing.

14. The steering device of claim 13, wherein a first cam guide portion on which one of the integrated cam plate and the detachable cam plate is rotatably seated is formed around the first through hole of the housing, and a second cam guide portion on which the other one of the integrated cam plate and the detachable cam plate is rotatably seated is formed around the second through hole of the housing.

15. The steering device of claim 1, wherein the speed reducer is a harmonic drive-type speed reducer.

16. The steering device of claim 15, wherein the speed reducer comprises:

the input shaft having a hollow shape and exposed downward through the housing;

a circular spline having a ring shape, supported by the lower side of the housing in a form surrounding the input shaft exposed downward through the housing, and having internal teeth formed on the inner circumferential surface;

a flex spline having a hollow shape, having external teeth formed on the outer circumferential surface to engage with the internal teeth, and being placed inside the circular spline;

a wave generator coupled to the input shaft and placed in the hollow of the flex spline to induce a part of the external teeth to engage with the internal teeth;

the output shaft disposed in the hollow of the input shaft and having a lower end coupled to a lower end of the flex spline; and an output shaft bearing that supports the output shaft and the flex spline to be relatively rotatable relative to the circular spline.

17. The steering device of claim 16, wherein the speed reducer further comprises:

a cover member having a ring shape through which the input shaft penetrates, coupled to the upper side of the circular spline, and supported by the lower side of the housing, and an input shaft bearing for inducing the relative rotation of the input shaft and the cover member is disposed in a through hole of the cover member through which the input shaft penetrates.

18. The steering device of claim 17, wherein a flex spline extension part extending in a direction perpendicular to the axis of the input shaft is formed at a lower end of the flex spline, an output shaft extension part extending in a direction perpendicular to the axis of the output shaft and coupled to the flex spline extension part is formed at a lower end of the output shaft, and an outer wheel of the output shaft bearing is coupled to the flex spline extension part and the output shaft extension part, and an inner wheel of the output shaft bearing is coupled to the lower side of the circular spline.

19. A steering device, comprising:

a housing;

a drive motor supported on the housing and having a motor shaft extending up and down;

a driving pulley coupled to the motor shaft;

a speed reducer including an input shaft parallel to the motor shaft; a driven pulley coupled to the input shaft;

a first stage pulley and a second stage pulley that rotate integrally about an axis parallel to an axis of the motor shaft and an axis of the input shaft;

a first belt connecting the driving pulley and the first stage pulley to transmit power; and a second belt connecting the second stage pulley and the driven pulley to transmit power.

20. A corner module, comprising:

a steering device according to claim 1; and the in-wheel drive device coupled to the output shaft of the steering device.

* * * * *